United States Patent
Schenk

(10) Patent No.: US 7,441,824 B2
(45) Date of Patent: Oct. 28, 2008

(54) FOLDING CONVERTIBLE TOP FOR A VEHICLE

(75) Inventor: Bernhard Schenk, Boeblingen (DE)

(73) Assignee: Daimler AG, Stuttgart (DE)

( * ) Notice: Subject to any disclaimer, the term of this patent is extended or adjusted under 35 U.S.C. 154(b) by 447 days.

(21) Appl. No.: 11/269,846

(22) Filed: Nov. 9, 2005

(65) Prior Publication Data

US 2006/0097540 A1  May 11, 2006

(30) Foreign Application Priority Data

Nov. 10, 2004 (DE) .................. 10 2004 054 160

(51) Int. Cl.
*B60J 7/00* (2006.01)
(52) U.S. Cl. ............................... 296/107.01
(58) Field of Classification Search ............ 296/107.01, 296/108, 121, 107.16, 107.17
See application file for complete search history.

(56) References Cited

U.S. PATENT DOCUMENTS

| 6,604,775 | B2 | 8/2003 | Obendiek | |
|---|---|---|---|---|
| 2002/0014782 | A1* | 2/2002 | Neubrand | 296/107.01 |
| 2003/0020299 | A1* | 1/2003 | Bauer et al. | 296/108 |
| 2003/0080580 | A1* | 5/2003 | Obendiek | 296/107.17 |
| 2005/0156449 | A1* | 7/2005 | Bruder et al. | 296/108 |
| 2007/0096500 | A1* | 5/2007 | Corder et al. | 296/121 |

FOREIGN PATENT DOCUMENTS

DE  199 60 010 C2  5/2001
DE  101 16 710 C2  10/2002

OTHER PUBLICATIONS

German Office Action Dated Sep. 8, 2005 (four (4) pages).
German Office Action Dated Sep. 8, 2005 w/ English Translation (Eleven (11) pages).

* cited by examiner

*Primary Examiner*—H Gutman
(74) *Attorney, Agent, or Firm*—Crowell & Moring LLP

(57) ABSTRACT

A folding convertible top for a vehicle has at least one roof part which can be displaced between a closed position and a stowed position, and can be brought out of the stowed position into a raised loading position. A folding-top kinematic mechanism on each side of the roof part has a main bearing element and an intermediate bearing element mounted rotatably on the main bearing element at a pivot point. The roof part is coupled both to the main bearing element and to the intermediate bearing element via links on both sides of the folding-top kinematic mechanism and can be displaced by means of at least one driving device. The driving device has at least one linear driving element that acts at least indirectly on the intermediate bearing element at a point remote from the pivot point of the intermediate bearing element with the main bearing element. A further device limits rotational movement of the intermediate bearing element during the movement of the roof part from the put-away position into the closed position. The roof part has a mass which acts on the pivot point via the link, such that during movement of the roof part from the stowed position into the closed position, movement of the link is possible only after the rotational movement of the intermediate bearing element is ended. A device is provided for preventing movement of the intermediate bearing element during movement of the roof part from the closed position into the stowed position.

17 Claims, 8 Drawing Sheets

FOLDING CONVERTIBLE TOP FOR A VEHICLE

BACKGROUND AND SUMMARY OF THE INVENTION

This application claims the priority of German patent document 10 2004 054 160.4, filed Nov. 10, 2004, the disclosure of which is expressly incorporated by reference herein.

The invention relates to a folding top for a convertible vehicle, with at least one roof part which can be displaced between a closed position and a stowed position.

German patent document DE 199 60 010 C2 discloses a folding top of the generic type and a corresponding vehicle. The folding top can be brought out of its stowed position in the luggage compartment of the vehicle into what is referred to as a loading position, in which it is possible to comfortably load the luggage compartment and then to bring the roof parts back into their stowed position.

However, a disadvantage of this known arrangement is that the necessary deflection requires an additional actuating or driving device (in this case an additional hydraulic cylinder) on both sides of the roof parts in order for them to take up the loading position. The driving device not only adds to production and installation costs but, as an additional component, it also poses an increased risk of failure.

It is therefore an object of the present invention to provide a folding top for a convertible vehicle, in which the entire sequence of movement of the at least one roof part can be undertaken with as little outlay as possible, in particular with just one driving device.

This and other objects and advantages are achieved by the folding top according to the invention, in which at least one linear driving element acts on an intermediate bearing element at a point remote from the pivot point of the intermediate bearing element with the main bearing element. In this manner, a very simple drive of the folding top according to the invention is possible via the intermediate bearing element. Because only a linear driving element is required for the driving device according to the invention, the number of driving elements required can be reduced by half in comparison to the prior art. As a result, expenditures on controls for moving the folding top is advantageously reduced, and reliability is increased. Furthermore, the omission of deflecting and control levers (such as are used in prior art arrangements) is possible, and, in addition, the structural configuration of the intermediate bearing element is simplified.

The folding-top construction according to the invention ensures an exactly defined position of the at least one roof part in each movement situation of the folding top. As a result, a regulated sequence of movement arises both during the opening and closing and also during the movement of the same into the loading position, even at different temperatures, in which the folding-top kinematic mechanism may differ in movement between easy-running and sluggish.

According to the invention, the roof part has such a mass which acts on the pivot point via the link, so that during the movement of the roof part from the stowed position into the closed position, movement of the link is possible only after the rotational movement of the intermediate bearing element has ended. Thus, an external, additional guide, such as, for example, an additional hydraulic cylinder, is not required for this movement. All that is necessary is a device for limiting the rotational movement of the intermediate bearing element during the movement of the roof part from the stowed position into the closed position, against which device the intermediate bearing element strikes. The rotational movement of the link (and therefore of the roof part) takes place after this striking has occurred.

During the reverse movement (i.e., the movement of the roof part from the closed position into the loading position), according to the invention a device is provided for preventing the movement of the intermediate bearing element, and for preventing an unintentional sinking of the intermediate bearing element.

According to a variation of the above embodiment, where the mass of the at least one roof part is not sufficient to assure that movement of the link occurs only after the rotational movement of the intermediate bearing element is ended, the link is guided by means of a guide device at least during its movement from the closed position into the loading position. The folding top is therefore guided by this guide device during the movement from the closed position into the loading position.

If, furthermore, it is provided that the links of the folding-top kinematic mechanism are guided by means of the guide device during their movement between the loading position and the put-away position, then an even more reliable guiding of the folding top according to the invention is provided.

A direct coupling of the folding-top kinematic mechanism (and therefore of the entire folding top) is produced if the links of the folding-top kinematic mechanism are attached rotatably to the intermediate bearing element at the point of the intermediate bearing element at which the linear driving elements act.

In another advantageous embodiment of the invention, the guide devices each have a guide track formed in the main bearing element, and a bolt that is attached to the link of the folding-top kinematic mechanism and engages in the guide track. Such a guide track and bolt assure a reliable guiding of the two roof parts in all of the phases of their movement.

In an alternative embodiment of the invention, the guide devices each have a blocking element attached movably to the intermediate bearing element and a bolt which is in engagement with the blocking element and is attached to the link of the folding-top kinematic mechanism. Such a blocking element likewise ensures, via the bolt which is in engagement with it, that the link of the folding-top kinematic mechanism is guided. This mechanism ensures that the two roof parts are sufficiently guided in all operating situations.

A further embodiment of the invention is produced when the guide devices each have a blocking element which is engaged with a rigid element during the movement of the roof parts from the closed position into the loading position. As a result, it is possible to omit entirely the guide tracks if the abovementioned first blocking element is used.

Other objects, advantages and novel features of the present invention will become apparent from the following detailed description of the invention when considered in conjunction with the accompanying drawings.

DETAILED DESCRIPTION OF THE INVENTION

Figure 1:
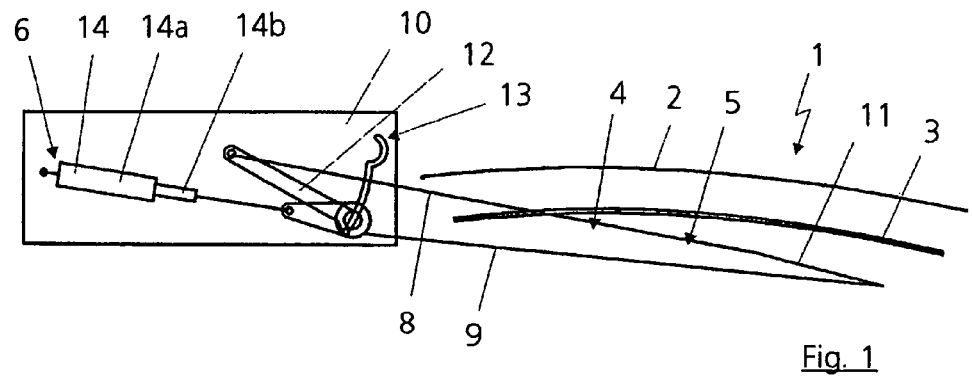
FIG. 1 shows the folding top according to the invention in its stowed position.

FIG. 1 shows a folding top 1, in the form of a hardtop folding top, for a convertible vehicle (not illustrated in its entirety). The term "folding top" here includes all moveable roofs that are used in the case of open vehicles, such as convertibles, roadsters and the like. In the present case, the folding top 1 has two roof parts, namely a front roof part 2 and a rear roof part 3. In the illustration according to FIG. 1, the two roof parts 2 and 3 are situated in their stowed position in a luggage compartment (not illustrated) of the vehicle. As described below and known, for example, from German patent document DE 199 60 010 C2, the folding top 1 can be brought by means of a corresponding closing movement into its closed position in which it forms a roof of the vehicle. This closed position of the folding top 1 is illustrated in FIG. 3.

Figure 2:
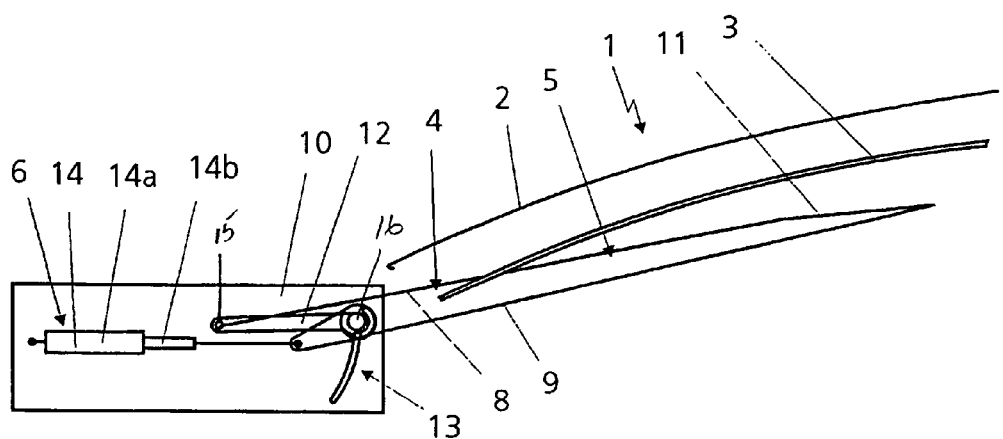
FIG. 2 shows the folding top from FIG. 1 in its loading position.

By contrast, FIG. 2 shows what is referred to as a loading position, in which the folding top 1 is raised by a certain amount with respect to its stowed position in order to permit better access to the luggage compartment of the vehicle. When a driver or occupant of the vehicle equipped with the folding top 1 wishes to load the luggage compartment, he or she can bring the folding top 1 out of its stowed position into the loading position, load the luggage compartment with any desired objects and thereafter return the folding top 1 to the stowed position.

Figure 3:
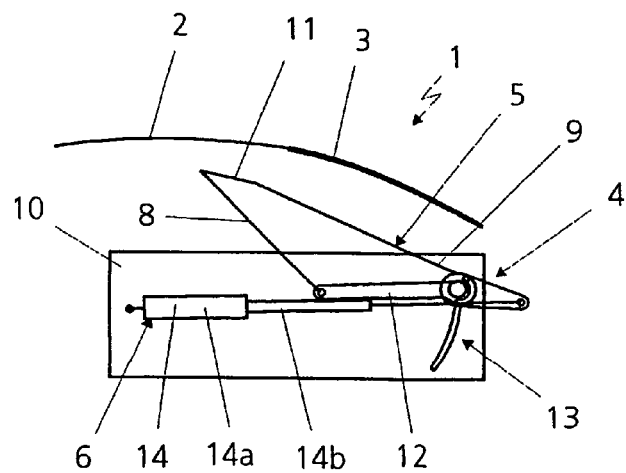
FIG. 3 shows the folding top from FIG. 1 in its closed position.

A folding-top kinematic arrangement 4, which includes a four-bar mechanism 5 and a driving device 6, is used to move the folding top 1 between the positions illustrated in FIGS. 1 to 3. The four-bar mechanism 5 includes a main link 8, a C-pillar link 9, an upper connecting link 11 connecting the main link 8 to the C-pillar link 9, and an intermediate bearing element 12 in the form of a link. The intermediate bearing element 12 could therefore also be referred to as an intermediate or control lever. The four-bar mechanism 5 (in this case, the main link 8 and the intermediate bearing element 12) is connected rotatably to a main bearing element 10 which is attached to the vehicle body (not shown). The main link 8 is articulated on the main bearing element 10, and the C-pillar link 9 is articulated on an intermediate bearing element 12.

As an alternative, the main link 8 could also be articulated to any desired other component. Also, if appropriate, the main link 8 could be omitted, for example in the event of an additional driving device between the two roof parts 2 and 3. Furthermore, it would also be possible for the folding top 1 to have just one of the two roof parts 2 and 3.

In a manner which is known per se (not shown in the FIGS. 1 to 3), the front roof part 2 is attached to the upper connecting link 11 and the rear roof part 3 is attached to the C-pillar link 9. In order to ensure reliable operation of the folding top 1 and to provide a uniform distribution of forces over the same, two folding-top kinematic mechanisms 4 are arranged on both sides of the folding top 1 and have respective four-bar mechanisms 5, driving devices 6 and main bearing elements 10, in a manner which is known per se, but is not illustrated for reasons concerned with clarity.

In order to guide the roof parts 2 and 3 during the movement between the stowed position, the loading position and the closed position, and thereby always to ensure a reliable and controllable movement of the folding top 1, in the embodiments illustrated a guide device 13 is provided which is explained in more detail below with reference to four different exemplary embodiments. A common feature of the four exemplary embodiments is that the intermediate bearing element 12 is guided in relation to the main bearing element 10, and therefore the C-pillar link 9, which is attached to the intermediate bearing element 12, is also guided by the guide devices 13, which are independent in each case of the driving devices 6. This arrangement leads ultimately to a defined movement of the roof parts 2 and 3 by the guide device 13.

Furthermore, in all of the embodiments the driving devices 6 each have a linear driving element 14 which, in the present case, is designed as a cylinder/piston unit and produces a linear movement. The driving devices in each case act at a point 16 which is remote from a pivot point 15 of the intermediate bearing element 12 with the main bearing element 10. (See FIGS. 4-6.) This point 16 is at the same time also the point at which the C-pillar links 9 are attached rotatably to the intermediate bearing elements 12. Each driving element 14 has a cylinder 14a and a piston rod 14b which can be extended out of the cylinder 14a in a manner known per se.

Figure 4:
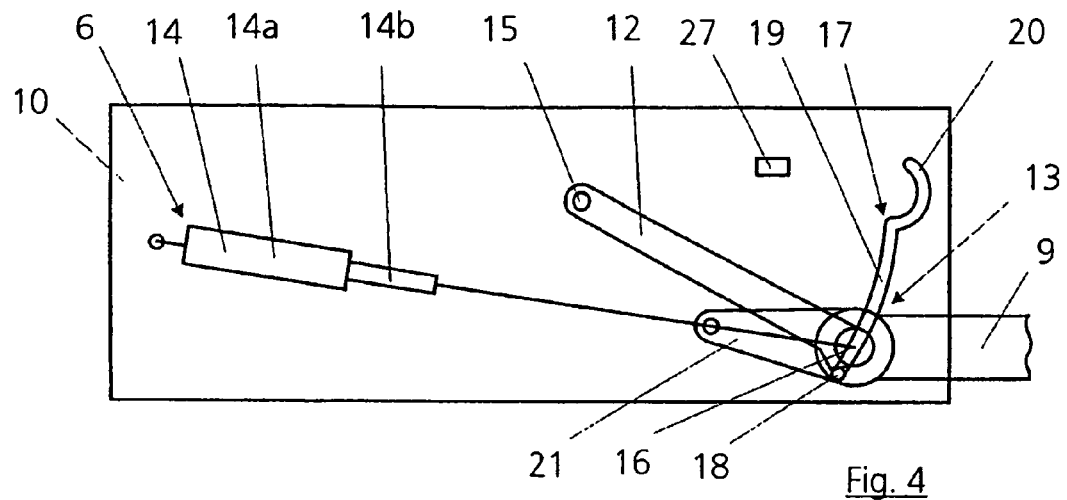
FIG. 4 is an enlarged illustration of a first embodiment of a guide device for the folding top according to the invention in the position according to FIG. 1.
Figure 5:
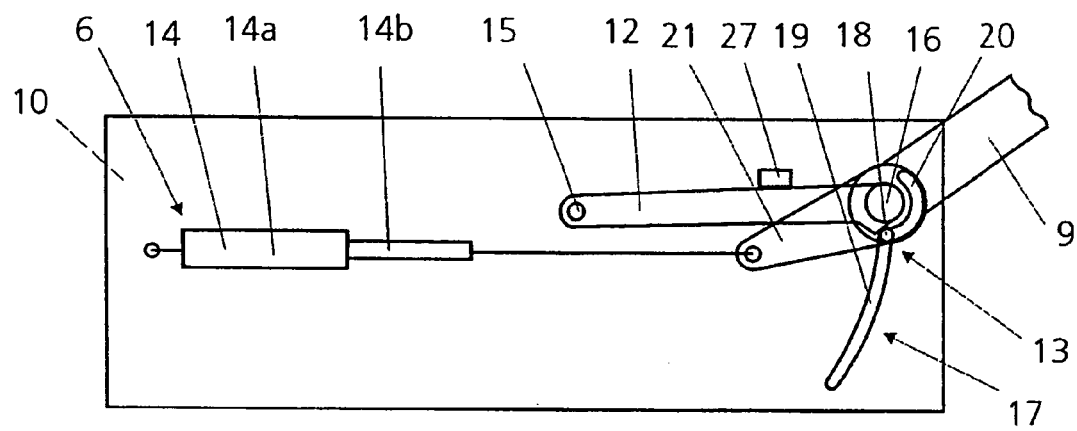
FIG. 5 shows the guide device from FIG. 4 in the position according to FIG. 2.
Figure 6:
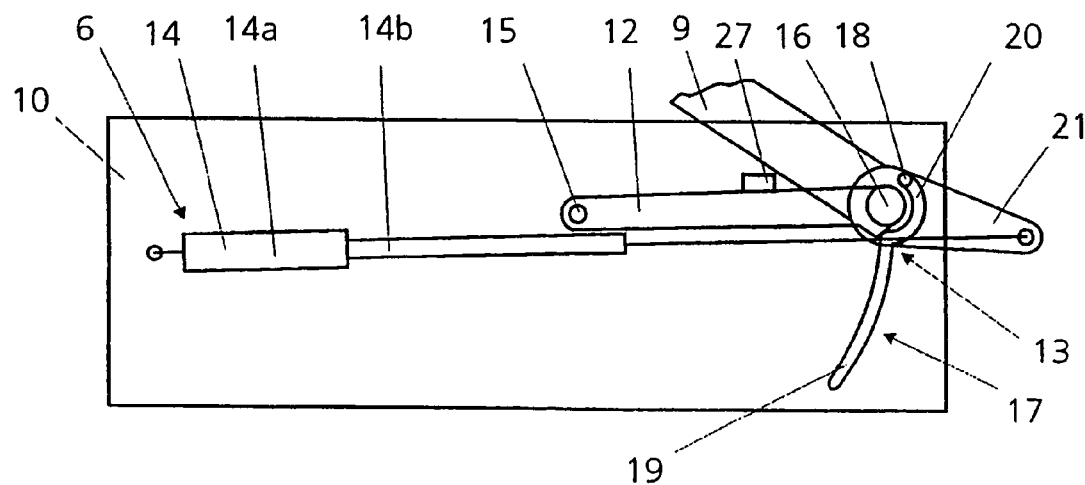
FIG. 6 shows the guide device from FIG. 4 in the position according to FIG. 3.

As shown in FIGS. 4-6, the guide device has a guide track 17 in the form of a groove in the main bearing element 10. A bolt 18 engages in the guide track 17, is attached to the C-pillar link 9 and guides the C-pillar link 9 in the guide track 17. As can also be seen, the guide track 17 is divided into two track sections 19 and 20 which adjoin each other, the lower track section 19 having the larger radius being assigned to the movement of the associated C-pillar link 9 between the loading position and the stowed position, and the upper track section 20 having a considerably smaller radius being assigned to the movement of the associated C-pillar link 9 between the closed position and the loading position. Both track sections 19 and 20 are designed as circular tracks, with the center point of the lower track section 19 corresponding to the pivot point 15 at which the intermediate bearing element 12 is mounted rotatably on the main bearing element 10. By contrast, the center point of the upper track section 20 is the point 16 at which the C-pillar link 9 is attached to the intermediate bearing element 12.

From a comparison of FIGS. 4, 5 and 6, the sequence during the movement of the roof parts 2 and 3 between the stowed position according to FIG. 4, the loading position according to FIG. 5 and the closed position according to FIG. 6 becomes clear. Thus, during the movement from the position according to FIG. 4 to the position according to FIG. 5, the piston rod 14b is extended out of the cylinder 14a and acts on the intermediate bearing element 12 via a connecting lever 21. In this case, the piston rod 14b acts on one end of the connecting lever 21 and, at the other end of the connecting lever 21, the intermediate bearing element 12 and the C-pillar link 9 are attached to the point 16, so that each linear driving element 14 acts on the intermediate bearing element 12 in each case indirectly via the connecting lever 21 at the point 16 which is remote from the pivot point 15 of the intermediate bearing element 12 with the main bearing element 10. The connecting lever 21 which acts as a lever arm therefore likewise rotates about the point 16. The force applied by the piston rod 14b rotates the intermediate bearing element 12 about its pivot point 15, so that it moves together with the C-pillar link 9 (which in this case is rigid), along the track section 19 of the guide track 17 which, in this embodiment, is arranged directly below the line of movement of the point 16. However, if appropriate, the guide track 17 could also be offset with respect to the line of movement of the point 16.

When the intermediate bearing element 12 has reached the position according to FIG. 5, the bolt 18 also reaches the end of the track section 19 and can therefore move farther, only along the track section 20 of the guide track 17. In this respect, the end of the track section 19 limits the rotational movement of the intermediate bearing element 12 during the movement of the folding top 1 from the put-away position into the closed position. The further extension of the piston rod 14b then leads to a rotation of the C-pillar link 9 about the point 16, with the bolt 18 being guided within the track section 20. In order to limit the movement of the intermediate bearing element 12 in the position according to FIG. 5, a stop 27 against which the intermediate bearing element 12 strikes is furthermore provided.

It would be possible in this case to omit the lower track section 19 of the guide track 17, since due to the kinematic arrangement of the intermediate bearing element 12 and the lever ratios present in this case, and due also to the mass of the two roof parts 2 and 3, it is ensured during the movement of the folding top 1 between the stowed position and the loading position that a movement of the link 9 is possible only after the rotational movement of the intermediate bearing element 12 is ended, so that ultimately a movement of the two roof parts 2 and 3 about the pivot point 16 is prevented. The upper track section 20 is required in particular for the movement of the roof parts 2 and 3 from the closed position according to FIG. 6 into the loading position according to FIG. 5, since it serves to prevent a movement of the intermediate bearing element 12 during the movement of the roof parts 2 and 3 from the closed position into the stowed position.

Figure 7:
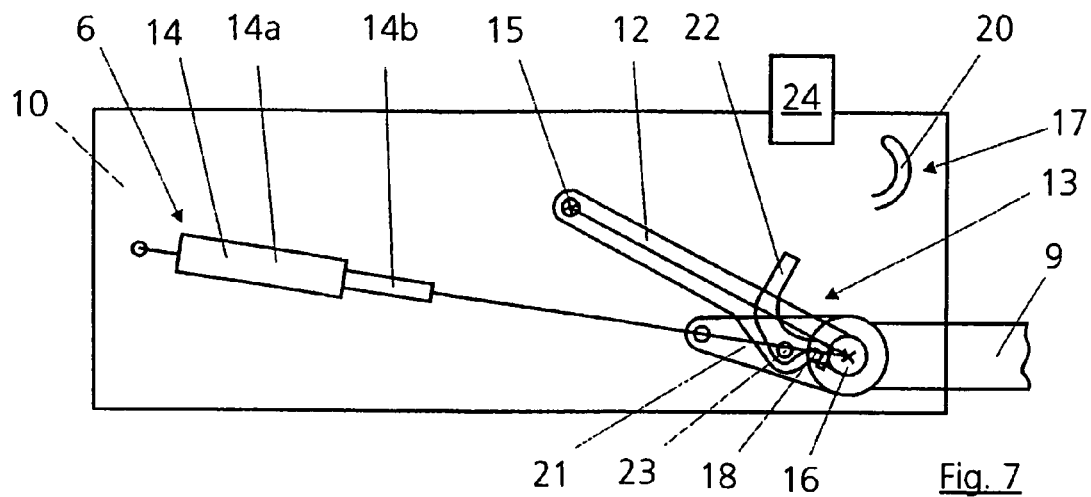
FIG. 7 shows a second embodiment of the guide device for the folding top according to the invention in the position according to FIG. 1.
Figure 8:
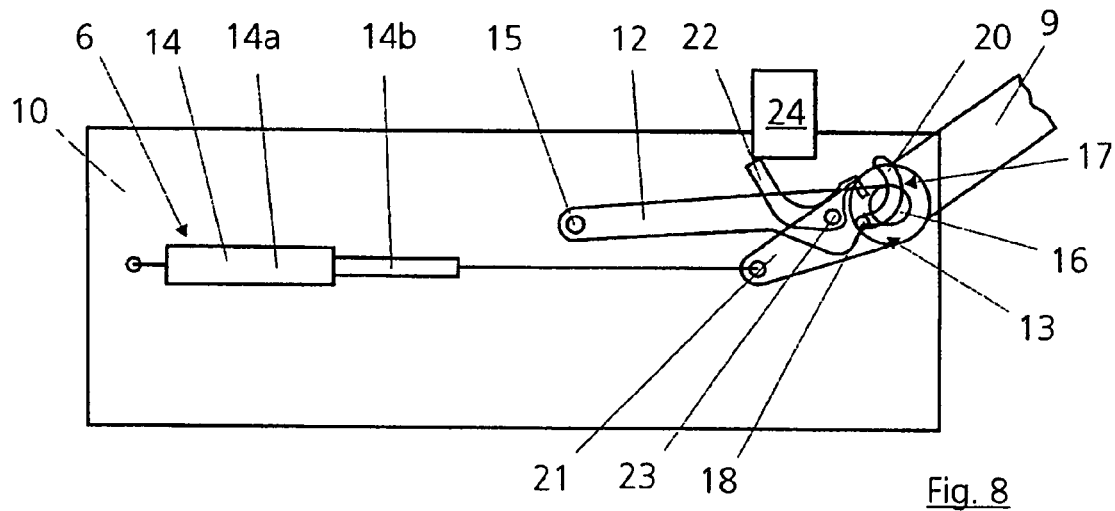
FIG. 8 shows the guide device from FIG. 7 in the position according to FIG. 2.
Figure 9:
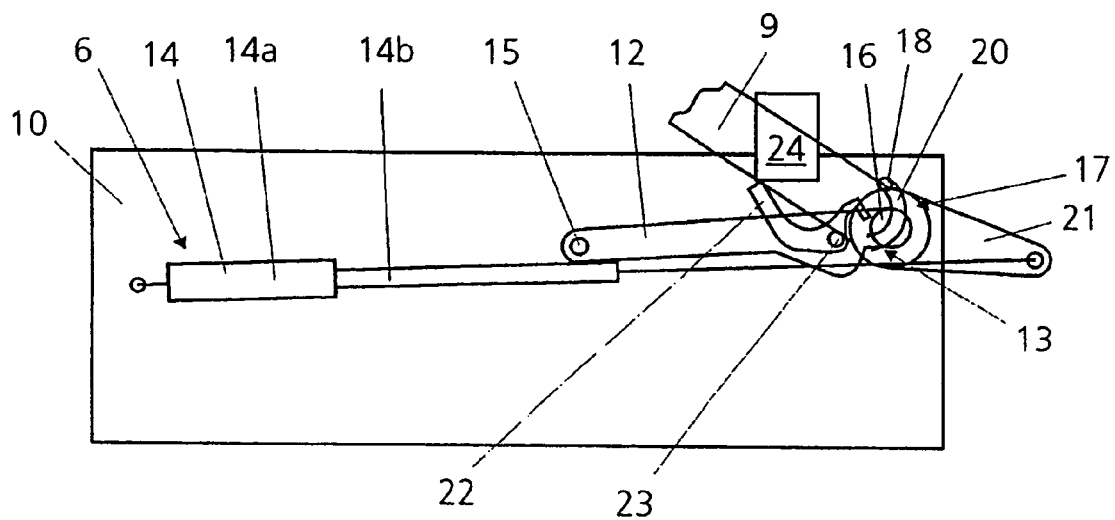
FIG. 9 shows the guide device from FIG. 7 in the position according to FIG. 3.

In an alternative embodiment of the guide device 13 according to the invention illustrated in FIGS. 7, 8 and 9, the guide track 17 has only the upper track section 20, the lower track section 19 being omitted and replaced by a blocking element 22. In this embodiment, the latter is attached moveably at a pivot point 23 to the intermediate bearing element 12, and therefore moves together with the same. During the movement of the roof parts 2 and 3 between the loading position and the stowed position, the blocking element 22 ensures a reliable guiding of the same by engagement with the bolt 18 during this movement. Starting from the stowed position according to FIG. 7, the movement of the intermediate bearing element 12 moves into the loading position according to FIG. 8, as described above, by an extension of the piston rod 14b. As already mentioned, the bolt 18 is engaged in this case with the blocking element 22, so that an unintentional movement of the C-pillar link 9 (and therefore the two roof parts 2 and 3 in relation to each other) is being prevented. When the position according to FIG. 8 is reached, the blocking element 22 strikes against a stop element 24 attached, for example, to the main bearing element 10, and thereby releases the bolt 18 when the loading position is reached.

The movement of the folding top 1 between the loading position according to FIG. 8 and the closed position according to FIG. 9 is identical to the movement which has been described with reference to FIGS. 5 and 6, and is therefore not explained in more detail below. The same also applies to the reverse movement of the folding top 1 between the closed position according to FIG. 9 and the loading position according to FIG. 8. If the folding top 1 is to be brought from the loading position according to FIG. 8 into the stowed position according to FIG. 7, then it is provided that the blocking element 22 again enters into engagement with the bolt 18 and locks the latter. For this purpose, the blocking element can be brought by a spring element (not illustrated), for example a pull/push spring or torsion spring, into the position illustrated in FIG. 8.

Figure 10:
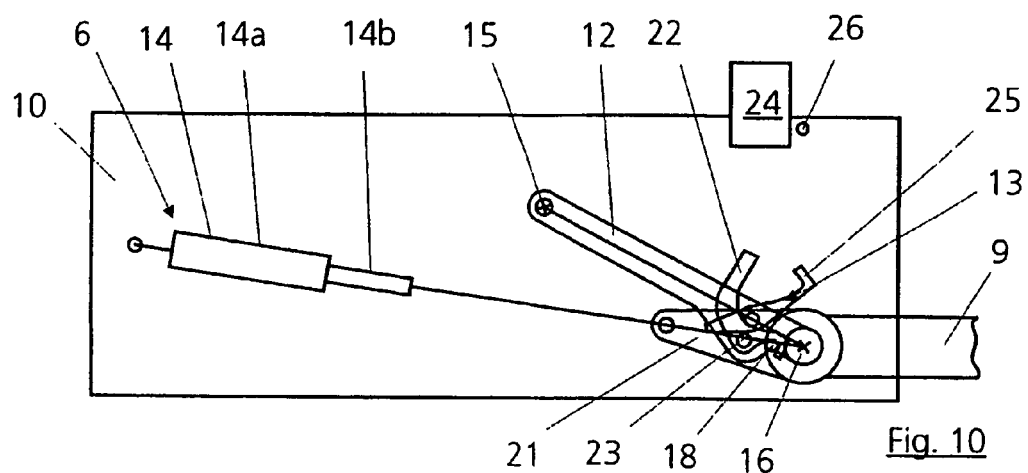
FIG. 10 shows a third embodiment of the guide device of the folding top according to the invention in the position according to FIG. 1.
Figure 11:
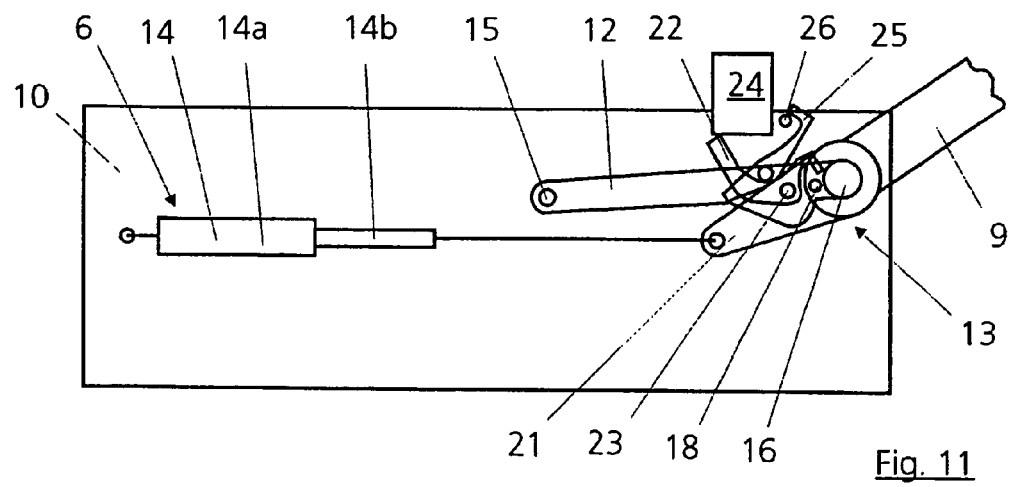
FIG. 11 shows the guide device from FIG. 10 in the position according to FIG. 2.
Figure 12:
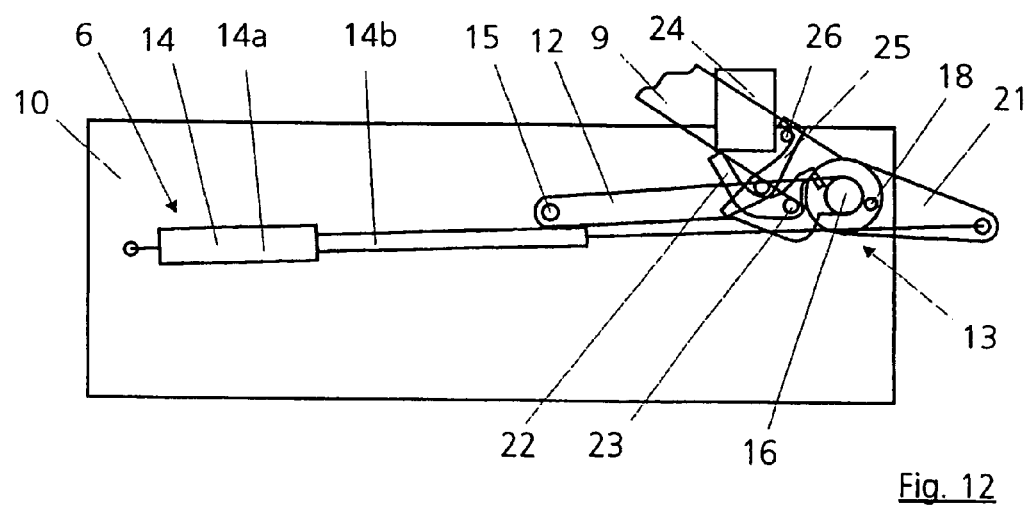
FIG. 12 shows the guide device from FIG. 10 in the position according to FIG. 3.
Figure 13:
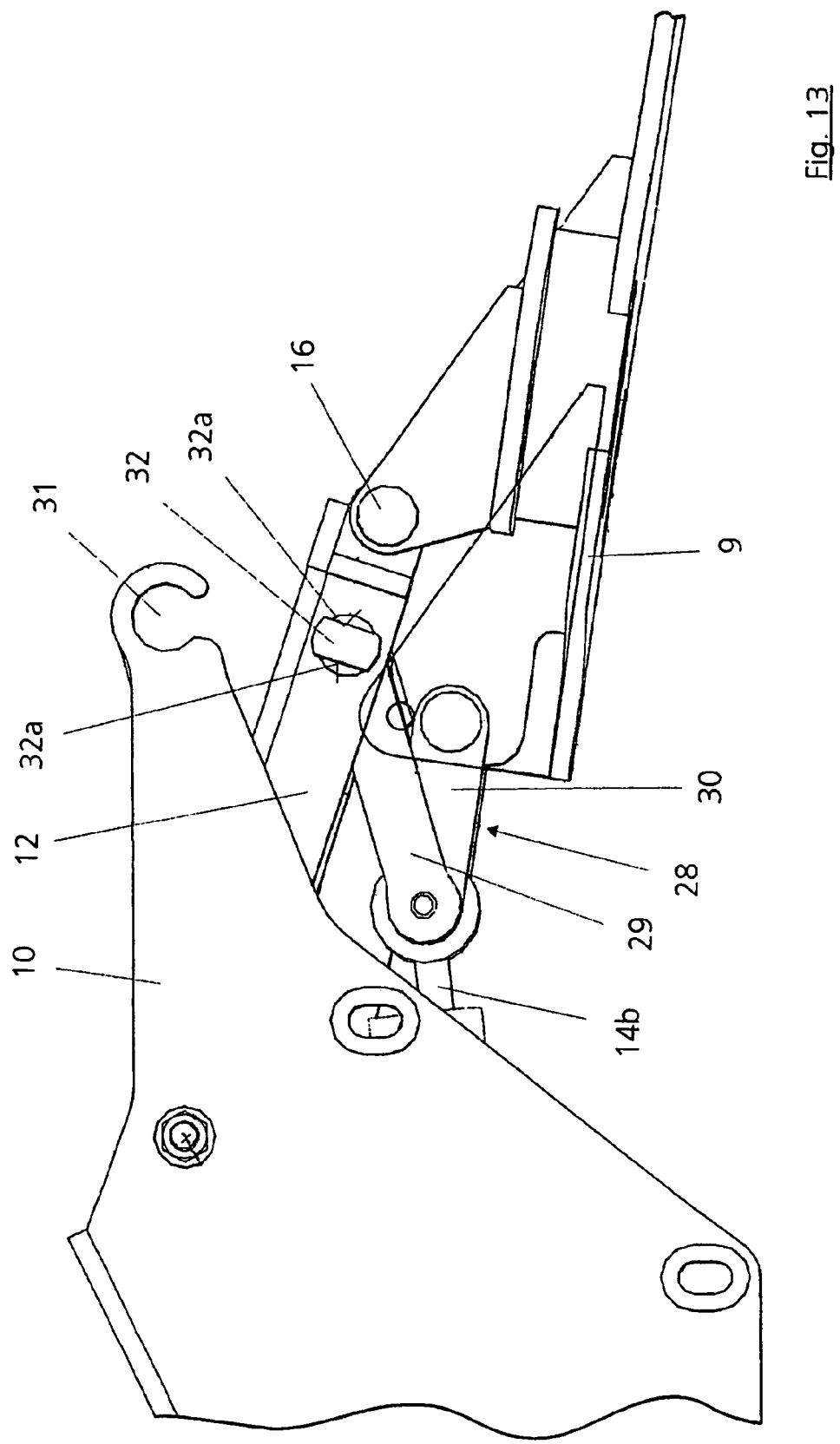
FIG. 13 shows a fourth embodiment of the guide device for the folding top according to the invention in the position according to FIG. 1.

In the embodiment of the guide device 13 according to FIGS. 10, 11 and 12, the guide track 17 is omitted entirely, and a further blocking element 25 is provided for the movement of the folding top 1 between the loading position according to FIG. 11 and the closed position according to FIG. 12. The blocking element takes on the function of the track section 20 (i.e., the prevention of the movement of the intermediate bearing element 12 during the movement of the folding top 1 from the closed position into the stowed position). As a result, the guide track 17 with the two track sections 19 and 20 can be omitted altogether. During the movement of the folding top 1 between the loading position according to FIG. 11 and the closed position according to FIG. 12, the blocking element 25 is in engagement with a rigid element (in the present embodiment, with a bolt 26 attached to the main bearing element 10), and therefore ensures that the intermediate bearing element 12 is locked in its upper position, so that only a rotational movement of the C-pillar link 9 about the point 16 is possible. The blocking element 25 therefore replaces the track section 20 and is required in particular in the stowed movement of the folding top 1 between the closed position and the loading position in order to prevent a movement of the intermediate bearing element 12, and therefore to prevent the folding top 1 from sinking.

When the loading position is reached from the closed position, the blocking element 25 strikes against the connecting lever 21. As a result, it is brought into its position releasing the bolt 26, so that upon further retraction of the piston rod 14b, a rotational movement of the intermediate bearing element 12 and of the C-pillar link 9 about the point 15 can take place. As a result, the stowed position is resumed from the loading position. Of course, as the stop for the second blocking element 25, use could also be made of a different component which is capable of releasing the bolt 26 when the loading position is reached from the closed position. The blocking element 25 can also preferably be brought by means of a spring element (not illustrated) into the position in which it is in engagement with the bolt 26.

In the embodiment of the folding top 1 according to FIGS. 13 to 16, a lever arrangement 28 with two levers 29 and 30 is provided between the linear driving element 14 and the intermediate bearing element 12. The lever 29 is connected on the one hand to the piston rod 14b of the linear driving element 14 and on the other hand to the intermediate bearing element 12; on the other hand, the lever 30, which is likewise connected to the piston rod 14b of the linear driving element 14, is connected to the C-pillar link 9. As can be seen for example in FIG. 16, two levers 30 are provided, but this is not absolutely necessary. The lever arrangement 28 ensures that at every moment of the movement of the folding top 1 favorable (i.e., similar) lever ratios are provided with regard to the driving of the C-pillar link 9 by the linear driving element 14; therefore a uniform torque profile at the pivot point 16 and a uniform speed of the folding-top movement are also achieved.

Figure 14:
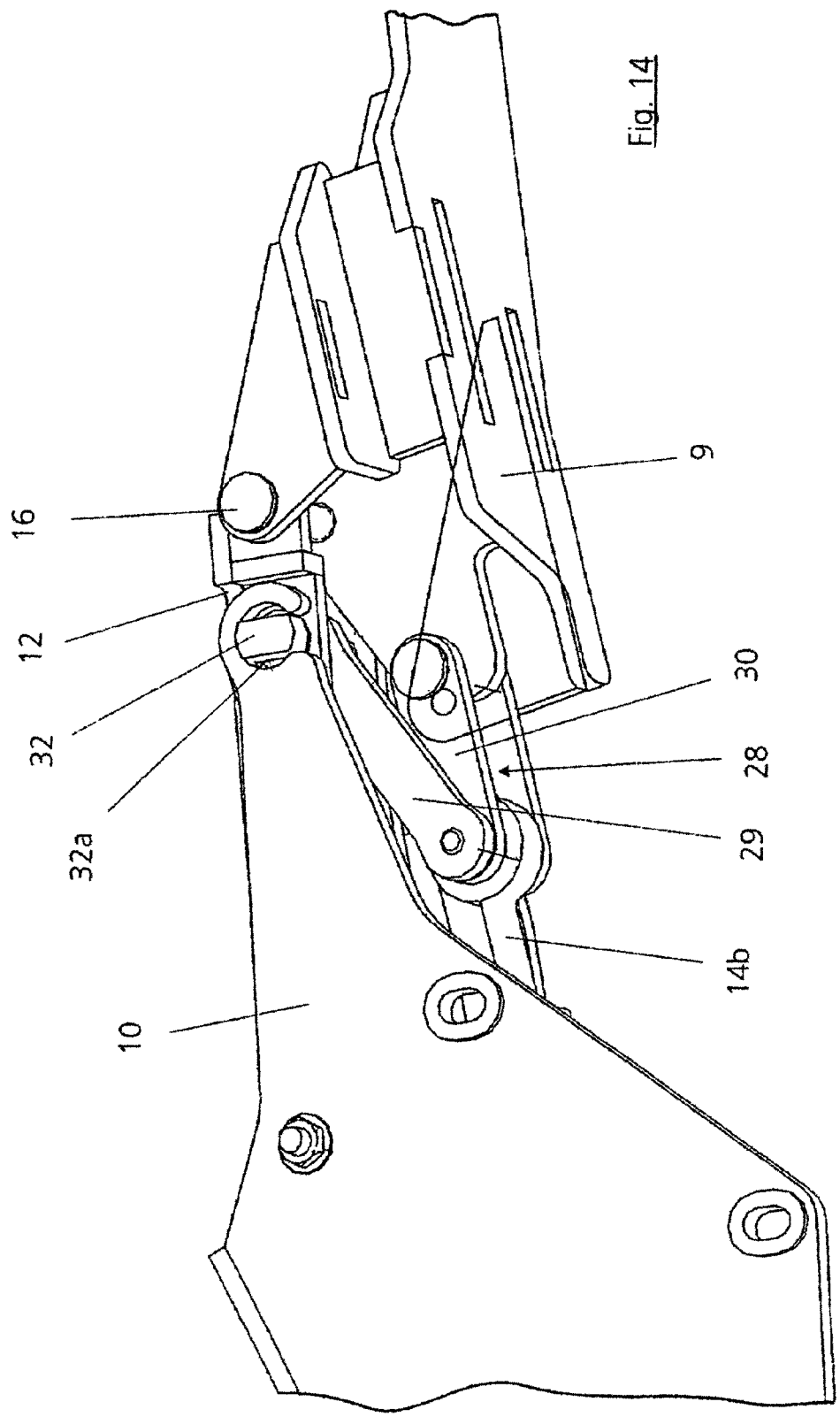
FIG. 14 shows the guide device from FIG. 13 in the position according to FIG. 2.
Figure 15:
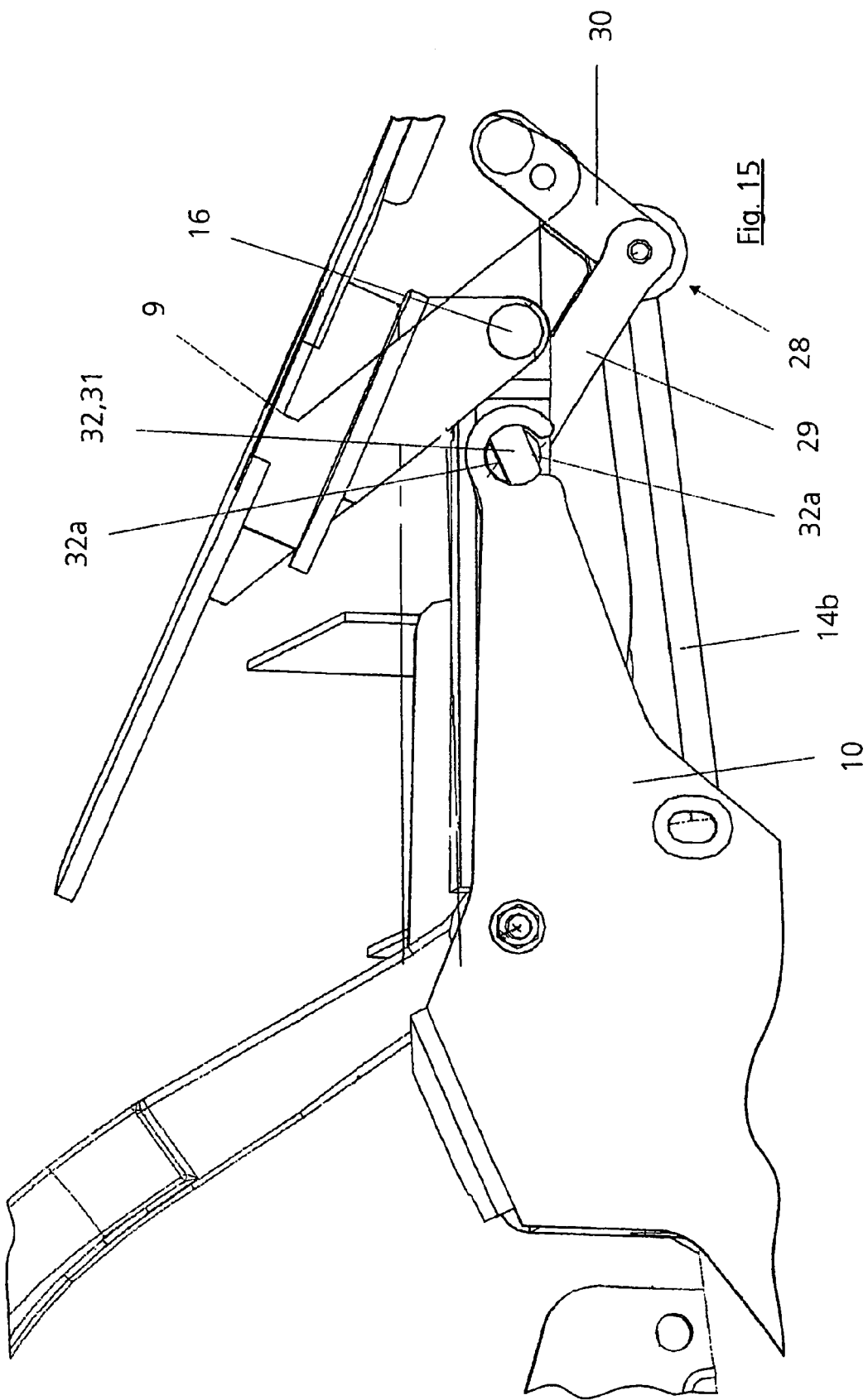
FIG. 15 shows the guide device from FIG. 13 in the position according to FIG. 3.
Figure 16:
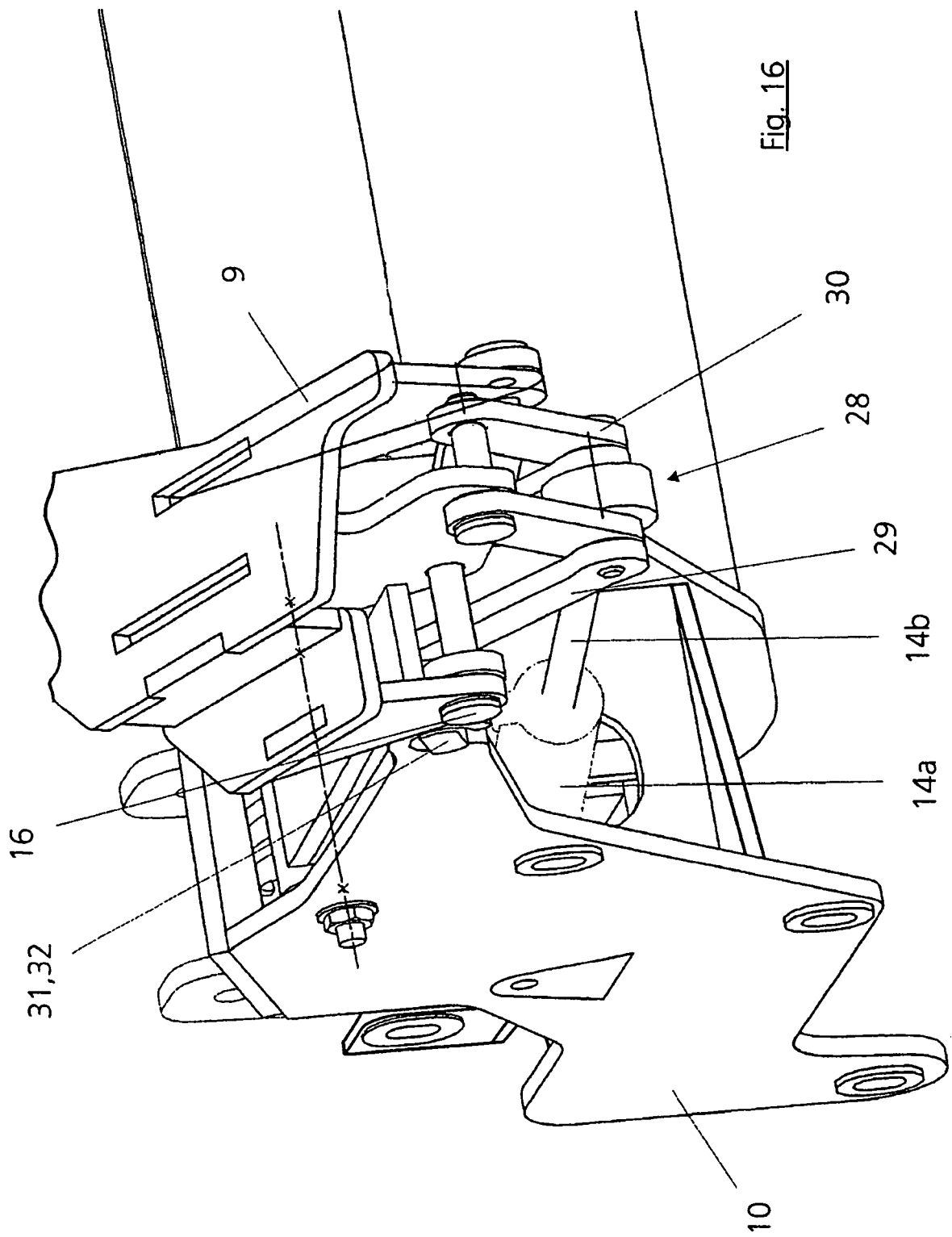
FIG. 16 shows a further illustration of the guide device from FIG. 13 in the position according to FIG. 3.

Furthermore, in this embodiment, neither the guide track 17 nor one of the two blocking elements 22 or 25 is provided. On the contrary, the guide device 13 has a recess 31, which is provided in the main bearing element 10, and a projection 32, which is attached to the lever 29 connected to the intermediate bearing element 12. The projection 32 is cylindrical in its basic shape and has two flattened portions 32a which run parallel to each other and permit the projection 32 (as illustrated in FIG. 14) to run into the recess 31 during the movement of the folding top 1 from the stowed position into the loading position. If the C-pillar link 9 is then rotated, as illustrated in FIG. 15, then the lever 29 also carries out a rotation and the projection 32 is locked in the recess 31. As a result, during the movement of the roof parts 2 and 3 between the closed position and the loading position, the intermediate bearing element 12 is locked in relation to the main bearing element 10. FIG. 16 shows merely a different perspective view of FIG. 15, in which the lever arrangement 18 is clarified once again. In an embodiment (not shown), it would also be possible to attach the projection 32 to the main bearing element 10 and to provide the recess 31 on the lever 29.

The track section 19 of the guide track 17 or the blocking element 22 may be entirely omitted if the roof parts 2, 3 have a mass, which acts on the pivot point 16 via the C-pillar link 9 such that, during the movement of the roof parts 2, 3 from the put-away position into the closed position, movement of the link 9 is possible only after the rotational movement of the intermediate bearing element 12 has ended. This is the case in the present exemplary embodiments; thus, the guide device 13 described in the various embodiments is to be regarded only as an additional securing means. In this case, only the upper track section 20, the blocking element 25 or the combination of the recess 31 with the projection 32 is required. The latter serve as mentioned above, to prevent the movement of the intermediate bearing element 12 during the movement of the roof parts 2, 3 from the closed position into the loading position. That is, they prevent the intermediate bearing element 12 from sinking during the stowed movement of the folding top, until the loading position has been reached.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A folding top for a vehicle having at least one roof part that can be displaced between a closed position and a stowed position that is within the vehicle, and can be brought out of the stowed position into a loading position which is raised with respect to the stowed position, the folding top having a folding-top kinematic mechanism which has, on each side of the at least one roof part, a main bearing element and an intermediate bearing element mounted rotatably on the main bearing element at a first pivot point, and the at least one roof part being coupled both to the main bearing element and to the intermediate bearing element via links on both sides of the folding-top kinematic mechanism, and being displaceable by means of at least one driving device, wherein:

the driving device has at least one linear driving element which acts at least indirectly on the intermediate bearing element at a second pivot point which is remote from the first pivot point;

a first device is provided for limiting rotational movement of the intermediate bearing element during movement of the at least one roof part from the stowed position into the closed position;

the roof part has mass which acts on the second pivot point via the links, such that during the movement of the roof part from the stowed position into the closed position, a movement of the links is possible only after the rotational movement of the intermediate bearing element has ended; and a second device is provided for preventing movement of the intermediate bearing element during the movement of the roof part from the closed position into the loading position.

2. The folding top according to claim 1, wherein the link is guided by means of a guide device at least during the movement of the roof part from the closed position into the loading position.

3. A folding top for a vehicle having at least one roof part that can be displaced between a closed position and a stowed position that is within the vehicle, and can be brought out of the stowed position into a loading position which is raised with respect to the stowed position, the folding top having a folding-top kinematic mechanism which has, on each side of the at least one roof part, a main bearing element and an intermediate bearing element mounted rotatably on the main bearing element at a first pivot point, and the at least one roof part being coupled both to the main bearing element and to the intermediate bearing element via links on both sides of the folding-top kinematic mechanism, and being displaceable by means of at least one driving device, wherein:

the driving device has at least one linear driving element which acts at least indirectly on the intermediate bearing element at a second pivot point which is remote from the first pivot point;

a first device is provided for limiting rotational movement of the intermediate bearing element during movement of the at least one roof part from the stowed position into the closed position;

the link is guided by a guide device at least during the movement of the roof part from the closed position into the loading position; and a second device is provided for preventing movement of the intermediate bearing element during the movement of the roof part from the closed position into the stowed position.

4. The folding top according to claim 3, wherein, during their movement between the loading position and the stowed position, the links of the folding-top kinematic mechanism are guided by the guide device.

5. The folding top according to claim 4, wherein the links of the folding-top kinematic mechanism are attached rotatably to the intermediate bearing elements at the point at which the linear driving elements act on the intermediate bearing elements.

6. The folding top according to claim 5, wherein each of the guide devices has a guide track formed in the main bearing element and a bolt which engages in the guide track and is attached to the link of the folding-top kinematic mechanism.

7. The folding top according to claim 6, wherein the guide tracks each have a track section assigned to movement of the links between the closed position and the loading position, and a track section assigned to the movement of the links between the loading position and the stowed position.

8. The folding top according to claim 7, wherein:
the track section which is assigned to the movement of the links between the closed position and the loading position is circular, and has a center point that corresponds to the second pivot point; and
the track section which is assigned to movement of the links between the loading position and the stowed position is circular, and has a center point.

9. The folding top according to claim 5, wherein each of the guide devices has a blocking element attached moveably to the intermediate bearing element and a bolt which is in engagement with the blocking element during the movement of the roof parts between the loading position and the stowed position and is attached to the link of the folding-top kinematic mechanism.

10. The folding top according to claim 9, wherein a fixed stop element is provided for the blocking element, against which the latter strikes on reaching the loading position and releases the bolt.

11. The folding top according to claim 10, wherein after the loading position is reached the bolt is guided in a track section assigned to movement of the links between the loading position and the stowed position.

12. The folding top according to claim 11, wherein the blocking element is pressed into position engaging around the bolt by means of a spring element.

13. The folding top according to claim 5, wherein the guide device has a blocking element that is engaged with a rigid element during movement of the roof parts between the closed position and the loading position.

14. The folding top according to claim 13, wherein the blocking element is operable by a connecting lever connecting the intermediate bearing element to the linear driving element, to bring the blocking element into a position releasing the intermediate bearing element.

15. The folding top according to claim 14, wherein a lever arrangement with at least two levers is provided between the linear driving element and the intermediate bearing element, one of the levers being connected on the one hand to the linear driving element and on the other hand to the intermediate bearing element and the other lever being connected on the one hand to the linear driving element and on the other hand to the link.

16. The folding top according to claim 15, wherein the guide device has a recess in the main bearing element, in which a projection that is attached to the lever connected to the intermediate bearing element engages during the movement of the roof parts between the closed position and the loading position, for locking the intermediate bearing element in relation to the main bearing element.

17. A convertible vehicle comprising a folding top having at least one roof part that can be displaced between a closed position and a stowed position that is within the vehicle, and can be brought out of the stowed position into a loading position which is raised with respect to the stowed position, the folding top having a folding-top kinematic mechanism which has, on each side of the at least one roof part, a main bearing element and an intermediate bearing element mounted rotatably on the main bearing element at a first pivot point, and the at least one roof part being coupled both to the main bearing element and to the intermediate bearing element via links on both sides of the folding-top kinematic mechanism, and being displaceable by means of at least one driving device, wherein:
the driving device has at least one linear driving element which acts at least indirectly on the intermediate bearing element at a second pivot point which is remote from the first pivot point;
a first device is provided for limiting rotational movement of the intermediate bearing element during movement of the at least one roof part from the stowed position into the closed position;
the roof part has mass which acts on the second pivot point via the links, such that during the movement of the roof part from the put-away position into the closed position, a movement of the links is possible only after the rotational movement of the intermediate bearing element has ended; and
a second device is provided for preventing movement of the intermediate bearing element during the movement of the roof part from the closed position into the loading position.

\* \* \* \* \*